United States Patent Office 3,061,566
Patented Oct. 30, 1962

3,061,566
PROCESS FOR THE PREPARATION OF AN AQUEOUS DISPERSION OF DISCRETE POLYSPIRANE RESIN PARTICLES AND PRODUCT PRODUCED THEREBY
Robert E. Kass, Springfield, Albert H. Markhart, Wilbraham, and Charles F. Hunt, Springfield, Mass., assignors to Shawinigan Resins Corporation, Springfield, Mass., a corporation of Massachusetts
No Drawing. Filed Oct. 1, 1958, Ser. No. 764,493
6 Claims. (Cl. 260—29.2)

This invention relates to polyspirane resin compositions and to a method for the preparation of such compositions. More particularly it relates to polyspirane resin compositions made as aqueous dispersions from the monomers, the process for making the same and cured films resulting therefrom.

Aqueous dispersions of polymeric materials generally are known. Such dispersions comprise a suspension of the resin particles in the aqueous medium with the aid of emulsifiers and/or dispersants. The stability of the known dispersions is furthermore aided by the nature of most of the polymeric materials used for such dispersions, which consist of compounds which are essentially hydrophilic in nature or at least have a hydrophilic portion in the polymer. The dispersions of the present invention do not contain emulsifiers and/or dispersants, yet the resin particles contained therein remain in suspension after the removal of agitation from the dispersion. The discrete polyspirane resin particles in the dispersion, moreover, are hydrophobic by nature, hence do not aid the stability of a dispersion containing such particles. The formation of an aqueous polyspirane dispersion, therefore, is certainly surprising as well as novel.

An important advantage of the present dispersion is the elimination of solvents commonly used in the preparation of coating compositions from polymeric materials and the consequent disadvantages attendant to this use of such solvents. Solvents are obviously more expensive than water and often require special removal to prevent noxious odors. In addition thereto, very few solvents are known for polyspirane compositions, hence the present invention is particularly beneficial to a more general application of this polymer. The present compositions can be cast as a continuous film and heat-cured to a solid resinous product.

The dispersions of the present invention possess an additional advantage by way of elimination of an emulsifier or disperant. Such agents increase the cost of the dispersion. But even more important, these agents often modify the properties of the final resinous product in a deleterious manner. As an example, the use of even small amounts of ionic emulsifiers in a polyspirane resin used for electrical insulation reduce the dielectric properties by a significant amount.

The primary object of this invention is the preparation of an aqueous polyspirane dispersion. A further object of this invention is to prepare a cross-linkable polyspirane composition which can be cured to a smooth, tough, hard, flexible film which is abrasion resistant, temperature resistant, and solvent resistant. These and other objects will become readily apparent from the following examples and from subsequent discussions thereon.

The primary object of this invention can be accomplished by the polymerization of a solution of the dialdehyde and polyhydric alcohol monomers of the polyspirane in water according to the suitable conditions of polymerization. The polymerization products of the present invention comprise an aqueous dispersion of discrete cross-linkable polyspirane resin particles which dispersion itself can be cast as a film and heat-cured to obtain the properties above described. The dispersion is thixotropic in that it will assume the consistency of a soft gel with time that can be brought back to its original fluid state by simple agitation.

The particular polyspirane resin that is acceptable in the practice of the invention can be represented by the following formula:

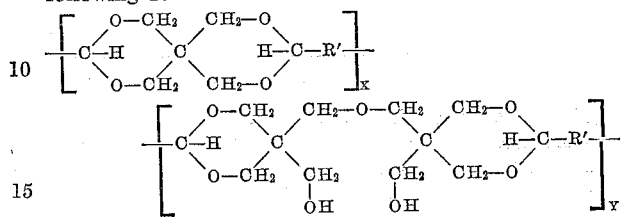

where R' is taken from the group consisting of aliphatic hydrocarbon radicals defined by $(CH_2)_S$ where $S$ is an integer from 2–3 and aromatic hydrocarbon radicals, $X+Y$ is equal to an integer from 2 to 20 and $Y$ is equal to no more than 50% of $X+Y$. The acceptable molecular weight range for this invention is 400–5,000.

The thixotropic dispersion of the above resin is obtained by reacting a dialdehyde with monopentaerythritol or monopentaerythritol and dipentaerythritol to form discrete insoluble resin particles having a composition represented by the above general formula from the aqueous solution of the reactants. The condensation reaction and the polyspirane monomer polymerization take place as a single step process from the aqueous solution of the reactants. The reaction can be catalyzed by trace amounts of an acid, merely, but size of the resin particles formed during the polymerization reaction is affected by such conditions as the pH of the reaction medium, the temperature of the reaction, and the degree of agitation utilized for the reaction.

The effect of such variables will be more clearly defined hereinafter.

The invention is practiced in its preferred embodiment as illustrated in the following examples but is not limited thereto:

EXAMPLE 1

Into a 2 gal. reaction vessel equipped with a 7" dia. stator ring and a 3½ dia. four-bladed impeller capable of efficient high speed mixing is charged 900 gms. of technical pentaerythritol, which is a mixture of 88 parts by weight of the mixture of monopentaerythritol and 12 parts of dipentaerythritol, along with 2,630 gms. of a 25% by weight aqueous solution of glutaraldehyde stabilized to a pH of 2.65 with a mineral acid, 1.39 gms. of oxalic acid and in addition 2250 gms. of distilled water. The mixture is stirred at an impeller speed of 1610 r.p.m. and the contents heated to 90° C. by which time the pentaerythritol has all dissolved. The reaction is preferably carried out in a temperature range of about 90–100° C. and for a period of 8–12 hours.

The reaction product is a thixotropic aqueous dispersion of discrete polyspirane resin particles of average size range of 1–4 micron diameter. If a sample of this dispersion is heated sufficiently so that the water in which the resin particles are suspended is driven off, the isolated resin remaining will melt at about 220° C. The Ostwald viscosity of a 7½% by weight solution of the isolated, washed resin in cresylic acid is 40–70 centipoises at 20° C. The molecular weight of the polymer as calculated from hydroxyl group measurements is 1000–1200.

In Examples 2 and 3 the same procedure is followed as described in Example 1 for the preparation of the aqueous polyspirane dispersion, except that in substitution for the reaction mixture materials disclosed in that example, the materials listed in the following examples are used. The parts listed in these examples are all parts by weight.

EXAMPLE 2

Technical pentaerythritol _____ 70
Terephthaldehyde _____ 65
Conc. sulfuric acid (92.5% H₂SO₄) _____ 0.20
Water _____ 2000
Methanol _____ 100

EXAMPLE 3

Succinaldehyde (20% by weight aqueous soln.[1])___ 495
Monopentaerythritol _____ 157
Formic acid (100%) _____ .85
Water _____ 500

[1] The succinaldehyde soln. has been stabilized as in Example 1.

Examples 2 and 3 illustrate that aqueous dispersions of polyspiranes can be prepared from different monomer reactants for both the dialdehyde portion of the reaction product as well as the polyol portion therefor. All of the resins, as prepared in Examples 1–3 are cross-linkable polymers possessing a high degree of crystallinity or molecular orientation. The resins furthermore are insoluble in water and most organic solvents as typified by carbon tetrachloride, acetone, ethanol, ethyl ether, ethyl acetate, benzene, glacial acetic acid, and ethylene chloride.

The polyspirane dispersions prepared in Examples 1–3 have a pH of about 2–3.5 and the total solids in the dispersion is within the range of 6–25%. The discrete resin particles in the above dispersions average 1–4 microns in diameter. The resin size stated is adequate to prevent the polyspirane from immediately settling out of the dispersion. A rapid settling of the resin particles from the dispersion would hinder the production of films from the dispersion as well as increase the difficulties in storing the latter material.

The dispersion of the present invention can be prepared with the size of the resin particles contained therein other than as shown above. By maintaining an acid pH of the reaction system while increasing the agitation of the mixture, smaller particle sizes may be obtained. Such an effect is produced even in the strongly acidic solutions shown in the preceding examples which is a surprising result.

The effect of the two factors described which influence the size of resin particle in the dispersion may be experimentally determined. Where it is desired to obtain a particle size in the 1–4 micron diameter range, the pH of the reaction mixture can be kept relatively constant while varying the agitation of the mixture, e.g. mixer speeds, and measuring the resin particle size produced by microscopic or other known means. To illustrate the method for the preparation of a dispersion having a resin particle size essentially in the range of 1–4 micron diameter, the following polymerization reactions listed in Examples 4–9 were carried out. The results included therein illustrate that a desired particle size can be obtained merely by the combination of monomer solution acidity and rate of agitation.

EXAMPLES 4–9

The reactions were all carried out in the equipment described in Example 1 and under the conditions noted in Table 1. All parts shown for the reactants are in parts by weight.

It can be seen from the above results that the runs receiving the greater degree of agitation, as demonstrated by the r.p.m. column contained in Table 1, produced a larger fraction of particles in the desired size range. But it should also be noted that merely increasing the degree of agitation alone did not produce the desired result, since in Example 9 where a higher degree of acid content was utilized for the monomer solution, the resin particle size range increased beyond the 1–4 micron diameter shown in Example 8. In order to obtain a desired resin particle size, therefore, it was found necessary to conduct the polymerization reaction for the preparation of the aqueous polyspirane dispersion under controlled conditions both of pH and degree of agitation of the polymerization reaction mixture.

The necessity for control of the resin particle size in the preparation of an aqueous polyspirane dispersion can best be described from an appraisal of desirable properties in the end products obtained from such dispersions. As has been stated previously, resinous films can be cast from the dispersion. It has been further stated as one of the important objects of this invention that such films when cured result in a smooth, tough, hard, flexible material which is abrasion resistant, temperature resistant, and solvent resistant. And although the latter two properties, namely the temperature resistance and the solvent resistance, are, in a large measure, a function of the chemical composition of the polyspirane resin, all other properties mentioned are highly dependent upon the particle size of the dispersion.

The dependence of film properties on the particle size of the resin component of the dispersion can be explained by reference to the constitution of the film which is a fusion product of the individual discrete resin particles promoted by the heat and curing agent of the cure process. Such a product is certainly distinct from a film formed by a resin in solution wherein the properties of the film are not dependent upon the size of the resin particles which went into solution, such particles having lost their size identity during the solution process. Nor are the properties mentioned which are dependent upon the resin particle size for a polyspirane dispersion the same for a film cast from a solution of the same size particle. A further important commercial distinction which exists between such films is the needed cure temperatures therefore, wherein for the dispersion film a cure temperature above the melting point of the resin is required, whereas for the solution film such a requirement is not always present.

Other polyspiranes are suitable for the practice of this invention than those specifically shown in the examples and whose formulations will be obvious to the man skilled in the art after the following discussion. The dialdehyde component of the resin can be selected from the group consisting of (a) succinaldehyde, glutaraldehyde, suberic aldehyde, azaleic dialdehyde, sebacic dialdehyde, and mixtures thereof, (b) phthalic aldehydes and mixtures thereof, and (c) mixtures of (a) and (b).

The pentaerythritol component of the polyspirane condensation product can be (a) monopentaerythritol, or (b) a material taken from the group consisting of monopentaerythritol, and mixtures of monopentaerythritol with Table 1

| Example | Technical | | | Oxalic acid | R.p.m. | Resin Particle Size (Microns) |
| | Glutaraldehyde 25% sol. | Pentaerythritol | H₂O | | | |
|---|---|---|---|---|---|---|
| 4 | 1,970 | 720 | 1,800 | 0.11 | 0 | >100. |
| 5 | 2,460 | 900 | 2,250 | 0.139 | 45 | Mostly 64. |
| 6 | 1,970 | 720 | 1,800 | 0.222 | 1,100 | Mostly 4–8. |
| 7 | 1,970 | 720 | 1,800 | 1.11 | 1,100 | 50% 1–8, 40% 8–16, 10% 16–24. |
| 8 | 2,465 | 900 | 2,250 | 0.277 | 1,330 | 98% 1–4, 2% >4. |
| 9 | 2,465 | 900 | 2,250 | 1.39 | 1,330 | 90% 2–8, 5% 8–16, 5% 16–24. | dipentaerythritol containing up to 50% dipentaerythritol by weight of the mixture.

The preferred resin solids content of the polyspirane dispersions of this invention are 6-25 wt. percent. The minimum percent total solids of the dispersion that would be useful is dictated by the particular end-use of the dispersion. Therefore, where extremely thin films of polyspirane are to be cast directly from the dispersion, the total solids of this dispersion would necessarily be low. This statement obviously does not preclude the possibility of diluting a higher total solids dispersion for such an application. The maximum total solids possible for a polyspirane dispersion is believed governed by other factors in addition to the particular end use of the dispersion. Such other factors together with their effect upon the total permissible solids content of the dispersion, however, can be determined by experimentation. For example, it was possible to make up a dispersion suitable for the practice of this invention without the addition of the excess water added in the above examples to the reaction mixture. The effect of the added water in these examples merely lowers the viscosity of the resulting dispersion so as to reduce the torque requirements for the needed means of agitating the reaction mixture. Likewise it is possible to reduce the amount of water solvent used for the glutaraldehyde monomer used in the preceding examples and thereby also increase the amount of total solids of the aqueous polyspirane dispersions. By the reduction of the excess water in the monomer solutions, dispersions having a total solids of 38% can be made.

The particular acid catalysts suitable for the polymerization reaction to form an aqueous dispersion can be either inorganic acids such as hydrochloric, sulfuric, or phosphoric acids or organic types such as oxalic, p-toluenesulfonic, or formic acids. It is furthermore obvious that mixtures of acids may be used as well as acid anhydrides and such other precursors of acids as will convert to acids or yield acidic solutions with water. Illustrative of such latter materials are $AlCl_3$, $SnCl_4$, $TiCl_4$, and others. Although it is possible to prepare polyspirane dispersions having the desired resin particle size from monomer solutions having a pH lower than 2.0, the increased thixotropy of such dispersions will cause the material to gel more rapidly. As has been said previously, however, even though such effect takes place, the dispersion can be reconstituted merely by mechanical agitation. On the other hand, if a sample of the dispersion is adjusted to a pH of 7.0 the thixotropic effect is reduced greatly and more rapid settling of the resin particles occur.

Other monomer solvents are suitable for the preparation of the polyspirane resin dispersion as diluents for the water used in the preceding examples. A limitation is necessarily imposed upon the suitability of the solvent in that it not react with any of the other materials in the reaction mixture. It is also an obvious limitation on the solvent that it not boil off at the temperatures of the polymerization reaction although such a problem can be minimized by conducting such reaction under pressurized conditions with possibly the use of an inert gas. As diluents for the water used as a solvent, there can also be used dioxane, dimethyl sulfoxide, certain alcohols, dimethyl formamide and others.

Other polymerization temperatures may be used to form the aqueous polyspirane dispersions than those shown in the preceding examples. Temperatures in the range of 80–100° C. may be employed satisfactorily with faster polymerization rates and increased resin molecular weights occurring at the higher temperatures. A temperature range of 90–100° C. is preferred because it reduces the time required for a reasonable conversion to the polymer to about 8 hours in lieu of longer periods (e.g. 24 hours) generally required at 80° C. while yet minimizing the effect of precipitating larger than desired resin particles at higher temperatures.

The aqueous dispersions of the present invention may be used directly as coating compositions or otherwise to cast films which when heat-cured become tough, hard, flexible, abrasion resistant, temperature resistant, and solvent resistant. Such films are particularly suitable for electrical insulation having excellent dielectric properties in addition to the above useful properties. For example, a wire enamel was formulated directly from the dispersion prepared according to the composition shown in Example 8 above. The composition of the wire enamel, the method of application of the enamel to an electrical conductor, and the properties of the cured polyspirane film are all described in Example 10 below.

EXAMPLE 10

The aqueous polyspirane dispersion was diluted with water as follows:

| | Parts by weight |
|---|---|
| Polyspirane dispersion of Example 8 (approximately 23% solids) | 700 |
| Water | 150 |

The above enamel was coated on AWG 18 annealed copper wire by conventional dip means for a total of six passes and given a heat cure after each pass in a commercial-type wire enamel tower. The cured film was flexible, resisted the attack of a boiling solvent mixture of equal parts by weight of toluene and ethanol, resisted abrasion, and the coated wire could be stretched to at least 25% elongation without cracking the film. The dielectric strength of a sample exceeded 1500 volts/mil.

The curing temperature required to obtain a continuous hard film for the aqueous polyspirane dispersions of the present invention is generally limited to a temperature at or above the melting point of the particular resin used. The curing temperature selected can also be influenced in commercial practice by the type of curing equipment to be used and the desired time to complete the resin cure. For the composition in the present example, a standard commercial-type wire enamel tower was employed, wherein operating temperatures of 300° C. to 400° C. were employed at wire speeds of 8–12 f.p.m. through the tower.

The exact curing temperature of the cured cross-linked films of Example 10 was not determined during the wire tower run. Although the curing step was found to be a critical factor in producing good films; obtaining these temperatures is extremely difficult to do in such an apparatus because of the continuous travel of the coated wire through the tower during the curing process. Curing temperatures were obtained, however, for aqueous dispersions made according to the teachings of Example 1. When films of approximately .0005" thickness were cast from the dispersion and cured in a muffle furnace at 250° C. for 5 minutes, the films could be flexed over a ⅛" dia. mandrel without crazing and resisted the removal action of water.

The dispersions of the present invention can be used to provide surface coatings for metals and other materials which coatings may be decorative as well as having the useful properties listed above. The dispersion, furthermore, may be modified by the addition of pigments, plasticizers, extenders, and other known materials (i.e. stabilizers) where desired for the applications mentioned. Nor is it intended to limit the usefulness of the dispersions described heretofore to surface coatings exclusively. The dispersions of the present invention can also be used as adhesives and impregnating varnishes and the like.

In addition to the various applications for which the aqueous polyspirane resin dispersions are particularly suitable as hereinbefore described, it will be obvious to the man skilled in the art that not only other applications for the dispersions are apparent, but that variations in the compositions of the dispersions or the processes for the manufacture of those compositions are likewise within the scope of this invention.

What is claimed is:

1. A liquid dispersion comprising a plurality of discrete suspended polyspirane resin particles and water, said polyspirane resin having the general formula:

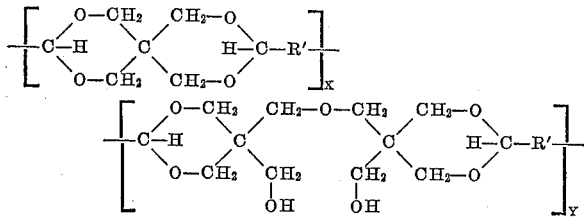

where R' is taken from the group consisting of aliphatic hydrocarbon radicals defined by $(CH_2)_S$, where S is an integer from 2–3, X plus Y is equal to an integer from 2–20 and Y is equal to no more than 50% of X plus Y, said suspended resin particles having an average size range of about 1–4 microns diameter, said dispersion being prepared by the process which comprises preparing an aqueous solution of approximately equimolar portions of monomer reactants totaling about 6 to 38% by weight of the solution, said monomer reactants consisting of (A) a dialdehyde selected from the group consisting of succinaldehyde, glutaraldehyde and mixtures thereof, and (B) an alcohol selected from the group consisting of monopentaerythritol and mixtures of monopentaerythritol with up to 50% by weight of the mixture of dipentaerythritol, reacting these monomers under agitation, with a solution pH of 2.0 to 3.5 at temperatures of 80–100° C. to produce polyspiranes having a molecular weight range of 400 to 5,000.

2. A water-resistant continuous film formed by heat drying and coalescing a coating of the dispersion of claim 1 on a substrate at a temperature between about the melting point of the resin and 400° C.

3. The process of insulating a metal substrate by coating said substrate with the dispersion of claim 1 and heat curing the coated substrate at a temperature of 250 to 400° C.

4. An electrically conductive metal wire insulated with a continuous coating of the dispersion of claim 1 dried at a temperature of 300 to 400° C.

5. A dispersion as in claim 1 containing a diluent for the water taken from the group consisting of methanol, dioxane, dimethyl sulfoxide, and dimethyl formamide.

6. A process for the preparation of an aqueous dispersion of a plurality of discrete polyspirane resin particles, said resin having the general formula:

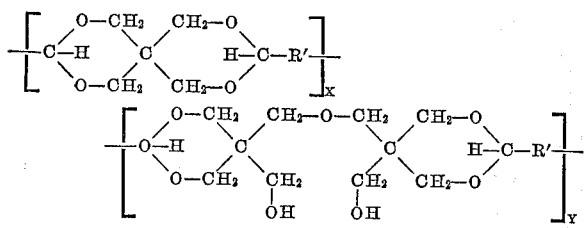

where R' is taken from the group consisting of aliphatic hydrocarbon radicals defined by $(CH_2)_S$, where S is an integer from 2–3, X plus Y is equal to an integer from 2–20 and Y is equal to no more than 50% of X plus Y, said process comprising reacting approximately equimolar portions of (A) a dialdehyde selected from the group consisting of succinaldehyde and glutaraldehyde and mixtures thereof and (B) an alcohol selected from the group consisting of monopentaerythritol and mixtures of monopentaerythritol with up to 50% by weight of the mixture of dipentaerythritol in an aqueous solution at a pH of 2.0 to 3.5, while agitating, at a temperature of 80–100° C. to produce said polyspirane resin in the form of suspended resin particles having an average size of about 1–4 microns diameter, said resin being equal to about 6 to 38% of the weight of the dispersion.

References Cited in the file of this patent
UNITED STATES PATENTS
2,785,996     Kress _____ Mar. 19, 1957